United States Patent [19]
Williams et al.

[11] Patent Number: 5,946,925
[45] Date of Patent: Sep. 7, 1999

[54] SELF-CONTAINED REFRIGERATION SYSTEM AND A METHOD OF HIGH TEMPERATURE OPERATION THEREOF

[76] Inventors: Donald C. Williams; Daniel Dorn, both of P.O. Box 5256, Traverse City, Mich. 49696

[21] Appl. No.: 09/060,612

[22] Filed: Apr. 15, 1998

[51] Int. Cl.⁶ .................................................. F25B 3/00
[52] U.S. Cl. .................... 62/196.4; 62/196.3; 62/216; 62/222; 62/505
[58] Field of Search ................ 62/196.3, 196.4, 62/216, 222, 505

[56] References Cited

U.S. PATENT DOCUMENTS

| | | | |
|---|---|---|---|
| 3,864,934 | 2/1975 | Jeding et al. | 62/196.3 |
| 5,063,750 | 11/1991 | Englund | 62/196.3 |
| 5,323,617 | 6/1994 | Ichikawa | 62/196.3 X |
| 5,653,119 | 8/1997 | Kimura et al. | 62/228.5 |

*Primary Examiner*—Henry Bennett
*Assistant Examiner*—Marc Norman
*Attorney, Agent, or Firm*—Douglas S. Bishop

[57] ABSTRACT

A self-contained refrigeration system utilizes a solenoid valve to meter refrigerant to a thermal process, the thermal process to be maintained at a predetermined temperature. When cooling of the thermal process is not required, refrigerant is recycled without coming into thermal contact with the thermal process by way of a hot gas bypass valve.

21 Claims, 1 Drawing Sheet

SELF-CONTAINED REFRIGERATION SYSTEM AND A METHOD OF HIGH TEMPERATURE OPERATION THEREOF

FIELD OF THE INVENTION

This invention relates generally to compression refrigeration systems, and more particularly to a system having a hot gas bypass valve operating in conjunction with a solenoid valve and liquid injection valve to control flow of refrigerant into an evaporator or heat exchanger.

BACKGROUND OF THE INVENTION

A simple compression refrigeration system generally comprises a compressor; a condenser; a refrigerant metering/expansion device, commonly termed an expansion valve or capillary tube; a heat exchanger, commonly termed an evaporator; and a temperature controller. Refrigerant vapor is compressed by the compressor, and in so doing raises the pressure and the temperature of the refrigerant. The vapor is fed into the condenser where the refrigerant releases heat to a cooling medium, resulting in a refrigerant condensate. The condenser cooling medium is generally air blowing over the condenser coils with a fan, or circulating water in a heat exchanger. The condensate then enters the expansion valve where the pressure and temperature of the condensate are reduced to preselected values. The cold refrigerant condensate then enters the evaporator at a reduced pressure. In the evaporator, the condensate absorbs heat from the thermal process and in so doing the condensate vaporizes. The change in temperature between the condensate and the vapor, as well as the latent heat of vaporization absorbed by the refrigerant, cools the thermal process which is in thermal contact with the evaporator. The refrigerant vapor is then recycled back into the compressor, thereby completing the circuit. In refrigeration systems using hermetically or semi-hermetically sealed compressors, the refrigerant vapor returning to the compressor serves to cool the electric motor that drives the compressor. Cooling of the compressor electric motor is an important function.

In response to a thermal process attaining a preselected temperature, a temperature controller shuts off the compressor. The compressor remains deactivated until the thermal process temperature rises above a preselected temperature threshold, at which point the temperature controller reactivates the compressor so as to charge the evaporator with reduced pressure refrigerant condensate. This type of general system has several limitations. The cycling of compressor activity to maintain a desired thermal process temperature results in wide temperature swings and additionally causes undue wear on the compressor. Further, the maximum preselected thermal process temperature is generally limited such that the refrigerant vapor recycled to the compressor is capable of cooling the compressor motor. In general, the refrigerant vapor must be maintained below 70° F. In instances where pressure limiting valves are installed in the recycle line, returning refrigerant vapor temperatures up to about 90° F. are functional.

In an effort to address these limitations, a hot gas bypass valve is installed such that hot gas may selectively be shunted from the inlet of a condenser to the inlet of an evaporator with a temperature controller driving the operation of either the hot gas bypass valve or the compressor. This refrigeration system operates in the same manner as that described above, until the thermal process is in thermal stasis. During this condition the temperature controller opens the hot gas bypass valve and bleeds hot vapor mixed with cold refrigerant condensate into the evaporator to reduce the cooling capacity of the refrigerant entering the evaporator. The activation of the hot gas bypass valve is an alternative to activation cycling of the compressor. The hot gas bypass valve is typically a solenoid valve that is controlled by the temperature controller which is simultaneously monitoring the thermal process heat load. Thus, when cooling is required the hot gas bypass valve is closed and only refrigerant condensate enters the evaporator. When thermal process cooling is not required, the temperature controller activates the hot gas bypass valve and hot vapor enters the evaporator thereby decreasing the instantaneous cooling capacity of the refrigeration system. In other instances, the hot gas bypass valve used in the prior art is a pressure operated valve that senses the recycle line pressure, which is also known as the suction pressure. Upon the thermal process attaining thermal stasis, the suction pressure goes below a preselected set point, thereby activating the hot gas bypass valve so as to allow hot vapor to enter the evaporator until the suction pressure increases to above the set point. Should the hot gas bypass valve have inadequate throughput to shunt all of the hot vapor, then the thermal process continues to cool even though the thermal process is already below the preselected temperature threshold. In response to such a condition, the temperature controller must cycle the compressor activation in order to maintain the thermal process within the bounds of preselected temperature thresholds.

In spite of the improvements associated with the introduction of a hot gas bypass valve and the configuration detailed above, a number, of limitations still persist. For instance, the hot vapor entering the evaporator tends to cause wide temperature fluctuations to the thermal process. In addition, should a hot gas bypass valve be required to shunt a large percentage of the hot vapor, then the refrigerant vapor recycled to the compressor will often be excessively warm to properly cool the compressor motor, thereby causing undue compressor wear and possibly compressor failure. Lastly, the maximum thermal process temperature remains limited in such a system by the requirement that the returning refrigerant vapor temperature be below 70° F. for a high recycle line pressure system, or below 90° F. in those systems where the recycle line is fitted with a pressure limiting valve.

Many laboratory and industrial cooling applications, including the operating of lasers, electron microscopes, ion beam generators and injection molding machines, require a thermal reservoir circulated at stable temperature, flow and heat capacity. Many of these applications require temperatures above 70° F. Since prior art refrigeration systems suffer above this temperature, such applications now use an external source of circulating cooling water functioning as a chiller.

The limitations of existing refrigeration systems is illustrated in regard to plastic injection molding machines, in which molten plastic is injected into a mold. Heat is removed from the molten plastic in order to solidify the molded article by circulating water through the cooling passages of the mold. Typically, a chiller supplies cooling fluid in a temperature range from about 40 to 70° F. A chiller of this design is limited to 70° F. as the maximum temperature due to the refrigeration componentry and design. Many thermoplastic and thermoset materials require cooling temperatures ranging from 100° F. to 200° F. and above in order to obtain the desired properties in the molded article. Currently in order to provide the higher cooling temperatures for some plastic molding applications, a mold temperature controller unit is required. Such a unit is equipped with a pump, heater, valves and controls in order to attain higher temperatures. When cooling is required, a valve system introduces quantities of water from the chiller, whereas heating is provided by the heater. Thus, to operate a conventional "mold temperature controller" an external source of cold water is required.

The instant invention strives to overcome the limitations of conventional cooling systems, as detailed above,

SUMMARY OF THE INVENTION

The invention relates to a novel self-contained refrigeration system in which the refrigerant is internally transferred in an intermittent fashion. In response to a thermal process requiring cooling, refrigerant is brought into thermal contact with the thermal process and when the thermal process does not require cooling, refrigerant is shunted by way of a hot gas bypass valve so that the refrigerant is recycled without coming into thermal contact with the thermal process. The further addition of a liquid refrigerant injection valve in parallel with the hot gas bypass valve allows for refrigerant being recycled to provide adequate cooling to the compressor element of the instant invention refrigeration system. The instant invention thereby provides for the maintenance of a thermal process at a temperature above that temperature required for the operation of the invention system compressor elements.

The refrigeration system of the instant invention includes conventional elements combined in a novel manner. A compressor is connected to a discharge line so that refrigerant passing through an outlet of the compressor enters the discharge line. A recycle line is connected to the inlet of the compressor. The discharge line and recycle line are in communication to form a closed refrigerant circuit by way of a condenser connected to the discharge line, a solenoid valve connected to the condenser, an expansion valve interposed between the solenoid valve and an evaporator, with the evaporator connected to the recycle line. A hot gas bypass valve is in communication with the discharge line and the recycle line, so as to form a shunt circuit between the discharge line and the recycle line, A temperature controller selectively activates the solenoid valve in response to the temperature of the thermal process crossing a preselected temperature threshold and thus regulating the temperature of the thermal process by controlling the amount of refrigerant in thermal contact with the thermal process. When the thermal process does not require cooling, the hot gas bypass valve is activated so as to shunt refrigerant to the recycle line.

The instant invention provides for thermal regulation of the thermal process at temperatures greater than 70° F. without the need for an external cooling source. Greater than 50% of the refrigerant entering the discharge line is optionally recycled to the compressor inlet by way of the hot gas bypass valve shunt circuit.

DETAILED DESCRIPTION OF THE PREFERRED EMBODIMENT

Figure 1:
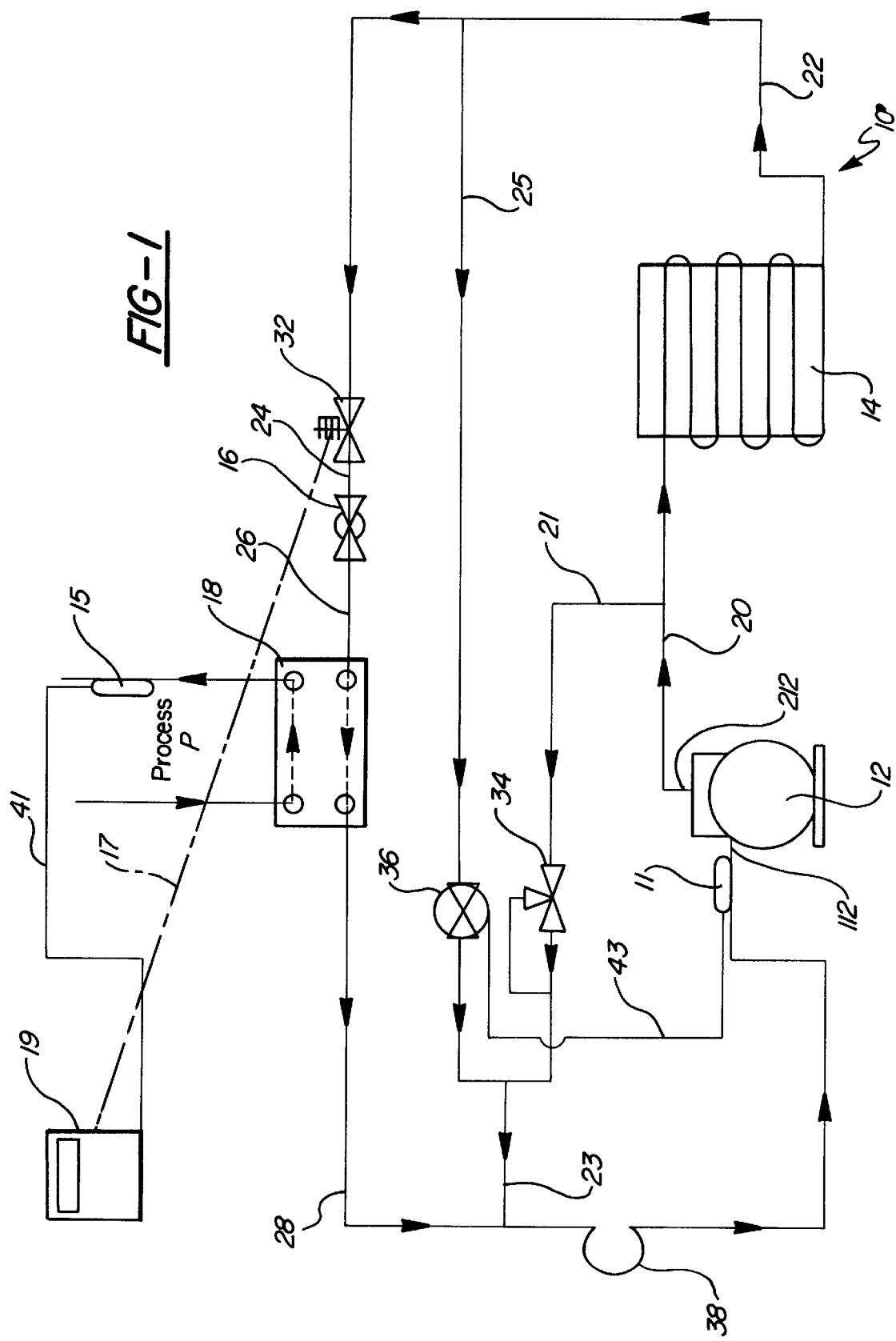
FIG. 1 is a functional diagram of a vapor compression refrigeration system according to the instant invention.

The instant invention utilizes conventional components in a novel arrangement such that a thermal process is maintained in a narrow temperature range without the necessity of cycling the activity of a compressor and without the danger of overheating a compressor motor. In addition, a thermal process is maintained above a cooling threshold greater than 70° F. without the necessity of an external cooling source. The attainment of such advantages will become apparent to one skilled in the art upon examining the relationships and configurations of the various components of the instant invention as detailed herein.

Referring to FIG. 1, a basic functional diagram of a vapor compression refrigeration system 10 is illustrated and includes a hot vapor bypass control operating in conjunction with a means for metering liquid refrigerant contacting a thermal process, in response to a cooling demand in accordance with the principles of the instant invention. It will be apparent to one skilled in the art that only the principal components of system 10 have been shown for clarity and that further standard components, illustratively including fans, valves, liquid receivers, filters, and dryers are readily added to the system as required for particular applications without departing from the spirit of the invention.

System 10 includes a compressor 12, a condenser 14, a refrigerant metering/expansion device 16, and a heat exchanger or evaporator 18, connected by refrigeration lines 20, 22, 24, 26 and 28 so as to form a closed loop refrigeration circuit. Interposed in the refrigeration circuit upstream from the refrigerant metering/expansion device 16 and adjoining refrigeration lines 22 and 24 is a solenoid valve 32. A refrigeration line 21 is in fluid communication with line 20. Line 21 is connected to a hot gas bypass valve 34, the valve 34 in turn connects to refrigeration line 23 so as to form a shunt circuit involving compressor 12, refrigeration lines 20 and 21, hot gas bypass valve 34, refrigeration line 23 and refrigeration line 28. Line 28 serving as a recycle line to the inlet 112 of the compressor 12. A temperature controller 19 is provided to monitor the temperature of a thermal process P which is to be moderated, the temperature controller 19 also functioning to activate and deactivate the solenoid valve 32 by way of electrical connection 17 in response to the temperature of thermal process P. Thermal process P is maintained in thermal contact with the evaporator 18 and therethrough to the system 10.

The compressor 12 of refrigeration system 10 is driven by a conventional electric motor (not shown) and operates to pull refrigerant vapor through recycle line 28, in this way the refrigerant vapor is compressed to a higher temperature and pressure and then discharged into the high pressure side of system 10 via the compressor outlet 212 and into line 20. The refrigerant vapor is cooled until forming a refrigerant condensate liquid in the condenser 14. The temperature drop of the refrigerant within the condenser 14 is caused by the condenser being in thermal contact with a condenser cooling medium (not shown). The condenser cooling medium is capable of absorbing sufficient quantities of heat from the refrigerant vapor such that the vapor is capable of transforming into a condensate within the confines of the condenser 14. Condenser cooling medium illustratively include circulating air and circulating water. The refrigerant condensate travels through line 22 until the condensate is blocked by solenoid valve 32 being in a closed position.

Upon sensor 15 relaying a signal to temperature controller 19 that the thermal process P is above a preselected temperature threshold, temperature controller 19 relays an electrical signal to the solenoid valve 32 via electrical connection 17. Sensor 15 is interfaced with temperature controller 19 via connection 41. Solenoid valve 32 opening permits refrigerant condensate liquid to enter the evaporator 18 successively through refrigeration line 24, refrigerant metering/expansion device 16, and refrigeration line 26. The refrigerant condensate liquid upon entering the evaporator 18 absorbs heat from the thermal process P which is in thermal contact with the evaporator 18. Upon the refrigerant liquid condensate absorbing a quantity of heat greater than the latent heat of vaporization characteristic of the refrigerant, the refrigerant is vaporized and is pulled to the compressor inlet 112 through the recycle line 28. It is appreciated that the deactivated state of the solenoid valve 32 is optionally open to allow refrigerant condensate liquid to enter evaporator 18 and that in response to sensor 15 indicating that the temperature of thermal process P had exceeded a preselected minimal temperature threshold that the temperature controller 19 functions to activate the solenoid valve 32 by way of the electrical connection 17, so as to close the solenoid valve to refrigerant condensate liquid communication with the evaporator 18.

In response to the accumulation of refrigerant condensate liquid in front of the solenoid valve 32, the internal pressure within the recycle line 28 decreases. The accumulation of liquid in front of the solenoid valve 32 occurs when the temperature of the thermal process P is within the bound of a preselected temperature threshold. The internal pressure within the recycle line caused by the pumping action of the compressor is defined herein to be the suction pressure. The decrease of pressure on the portion of system 10 downstream of the solenoid valve 32 through to the compressor 12 causes the hot gas bypass valve to open. The hot gas bypass valve 34 is preferably activated by pressure sensing. Optionally, a temperature or flow sensitive hot gas bypass valve is also operative herein. The opening of the hot gas bypass valve 34 effectively shunts refrigerant vapor from line 20 to the recycle line 28 thus, shunted refrigerant vapor returns to the compressor 12 without having entered the condenser 14 or the evaporator 18. The invention as described provides good thermal stability as compared to the prior art in part because hot, high pressure refrigerant gas is not injected into the evaporator. Furthermore, the system 10 operates with the compressor functioning in a more or less steady state. Without cycling of the compressor 12, the system 10 does not place undue strain on the compressor or its driving electric motor.

Preferably, the system 10 also includes a liquid injection valve 36 in a parallel arrangement with the solenoid valve 32. A refrigerant communicating juncture connects refrigerant line 25 to refrigerant liquid condensate carrying line 22, with line 25 terminating at the downstream end with a selectively communicating passage through liquid injection valve 36 and therethrough to line 23. The liquid injection valve 36 is responsive to a remote sensor 11. Sensor 11 monitors the operation of the compressor 12 or the compressor electric motor (not shown). Upon sensor 11 indicating that the compressor 12 is functioning beyond a preselected operational threshold, a signal is sent from the sensor 11 via connection 43 in order to activate liquid injection valve 36. The sensor 11 is operative by monitoring any number of compressor function parameters illustratively including motor amperage, refrigerant flow rate, refrigerant pressure and temperature. Preferably, the liquid injection valve 36 is a temperature operated valve and sensor 11 is a temperature sensitive device. More preferably, sensor 11 is a gas-filled bulb, but thermocouples or other sensors could be employed. Upon a compressor function parameter exceeding a preselected threshold, the liquid injection valve 36 is activated thus allowing refrigerant liquid condensate to enter the recycle line 28. The introduction of refrigerant liquid condensate to the refrigerant vapor present in the recycle line 28 serves to cool the refrigerant vapor and in so doing the refrigerant liquid condensate is largely vaporized. Preferably, the quantity of refrigerant liquid condensate allowed to pass through the liquid injection valve 36 is sufficient to cool the refrigerant vapor in recycle line 28 and in so doing completely vaporize. A mixing loop 38 is optionally spliced into the recycle line 28 downstream from line 23. The mixing loop 38 serves to promote equilibration between refrigerant vapor and refrigerant liquid condensate prior to the vapor/condensate mixture entering the compressor 12. The instant invention, through the inclusion of a hot gas bypass valve and a liquid injection valve as detailed in reference to FIG. 1, allows one to support thermal process cooling loads of from 0 to 100% of the thermal capacity of the system 10. Furthermore, a thermal process P is maintained at a stable temperature well above the refrigerant temperature necessary to cool the compressor drive motor in part because excessively hot refrigerant vapor is cooled by mixing with refrigerant liquid condensate introduced into the recycle line 28 via liquid injection valve 36. The optional addition of the mixing loop 38 ensures that all of the refrigerant liquid is vaporized during the course of cooling excessively hot refrigerant vapor so as to further protect the compressor from uptaking liquid refrigerant.

The system 10 is capable of maintaining a thermal process P at a temperature greater than 100° F. and even 200° F. yet still reduce the temperature of the refrigerant vapor in the recycle line 28 to a sufficiently low temperature to cool the compressor electric motor. In order to maintain a high thermal process temperature, a heating means is optionally placed in thermal contact with the thermal process P. Preferably, the heating means is interfaced with the temperature controller regulating the refrigeration system of the instant invention. If thermal system P requires heating to maintain the preselected temperature, the temperature controller 19 activates the heater; if the thermal process P requires cooling to maintain the preselected temperature, the temperature controller 19 activates solenoid valve 32 allowing the refrigerant to cool thermal process P by communication with the condensate in evaporator 18 through expansion valve 16 and refrigerant lines 24 and 26. The fine control of a thermal process temperature above 70° F. is a requirement for the operation of numerous technologically important instruments including those of: a laser, an electron microscope, an ion beam generator and an injection molding machine. Typically, the refrigerant vapor temperature at the compressor inlet 112 should be less than about 70° F. Optionally, splicing a pressure limiting valve into the recycle line 28 serves to lower the suction pressure between such a valve (not shown) and the compressor 12 such that refrigerant vapor may be returned to the compressor 12 at temperatures up to about 90° F. Even higher temperatures, up to 250° F., may be maintained by utilizing appropriate heat transfer fluid, or by putting the system under pressure.

Various modifications of the instant invention in addition to those shown and described herein will be apparent to those skilled in the art of the above description. Such modifications are also intended to fall within the scope of the appended claims.

What is claimed is:

1. A vapor compression refrigeration system comprising in combination:

a compressor having an inlet and an outlet;

a discharge line connected to the outlet;

a recycle line connected to the inlet;

a condenser having a condenser outlet, said condenser connected to said discharge line for receiving compressed refrigerant vapor from said compressor, said condensor being bathed by a condenser cooling medium so as to form a condensate from said vapor at the condenser outlet;

a temperature controller selectively activating a solenoid valve in response to a temperature of a thermal process crossing a preselected temperature threshold;

said solenoid valve connected to the condenser outlet such that upon activation of said solenoid valve, condensate communication with an evaporator is switched, said evaporator in thermal contact with said thermal process;

an expansion valve interposed between said solenoid valve and said evaporator; and a hot gas bypass valve in communication with said discharge line and said recycle line, said hot gas bypass valve activated in response to the temperature of said thermal process being within the bound of the preselected threshold so as to shunt said vapor to said recycle line.

2. A vapor compression refrigeration system comprising in combination:

a compressor having an inlet and an outlet;

a discharge line connected to the outlet;

a recycle line connected to the inlet;

a condenser having a condenser outlet, said condenser connected to said discharge line for receiving compressed refrigerant vapor from said compressor, said condenser being bathed by a condenser cooling medium so as to form a condensate from said vapor at the condenser outlet;

a temperature controller selectively activating a solenoid valve in response to a temperature of a thermal process crossing a preselected temperature threshold;

said solenoid valve connected to the condenser outlet such that upon activation of said solenoid valve, condensate communication with an evaporator is switched, said evaporator in thermal contact with said thermal process;

an expansion valve interposed between said solenoid valve and said evaporator;

a hot gas bypass valve in communication with said discharge line and said recycle line, said hot gas bypass valve activated in response to the temperature of said thermal process being within the bound of the preselected threshold so as to shunt said vapor to said recycle line; and a liquid injection valve activated in response to said compressor operating above a preselected compressor temperature, said liquid injection valve operating so as to shunt said condensate to said recycle line.

3. The refrigeration system of claim 2 further comprising a mixing loop interspersed between said recycle line and the inlet of said compressor, said loop promoting thermal equilibration between said vapor and said condensate.

4. The refrigeration system of claim 3 wherein thermal equilibrium occurs at a temperature less than 70° F.

5. The refrigeration system of claim 2 wherein said recycle line is fitted with a pressure limiting valve and thermal equilibration occurs at a temperature less than 90° F.

6. The refrigeration system of claim 1 further comprising a heating means in thermal contact with said thermal process such that said vapor in said recycle line is at a temperature below 90° F. independent of an external cooling source.

7. The refrigeration system of claim 6 wherein said heating means is interfaced to said temperature controller.

8. The refrigeration system of claim 1 wherein said condenser cooling medium is selected from the group consisting of: air and water.

9. The refrigeration system of claim 1 wherein the temperature threshold of said thermal process is greater than 70° F. and said vapor in said recycle line is at a temperature below 90° F. independent of an external cooling source.

10. The refrigeration system of claim 1 wherein the temperature threshold of said thermal process is between 70° F. and 190° F. and said vapor in said recycle line is at a temperature below 90° F. independent of an external cooling source.

11. The refrigeration system of claim 1 wherein the temperature threshold of said thermal process is between 70° F. and 250° F. and said vapor in said recycle line is at a temperature below 90° F. independent of an external cooling source.

12. The refrigeration system of claim 1 wherein said temperature controller selectively opens said solenoid valve in response to the temperature of said thermal processing crossing the preselected temperature threshold.

13. The refrigeration system of claim 1 wherein the preselected threshold is a temperature maximum and the temperature is greater than the threshold.

14. The refrigeration system of claim 2 further comprising a heating means in thermal contact with said thermal process such that said vapor in said recycle line is at a temperature below 90° F. independent of an external cooling source.

15. The refrigeration system of claim 14 wherein said heating means is interfaced to said temperature controller.

16. The refrigeration system of claim 2 wherein said condenser cooling medium is selected from a group consisting of: air and water.

17. The refrigeration system of claim 2 wherein the temperature threshold of said thermal process is greater than 70° F. and said vapor in said recycle line is at a temperature below 90° F. independent of an external cooling source.

18. The refrigeration system of claim 2 wherein the temperature threshold of said thermal process is between 70° F. and 190° F. and said vapor in said recycle line is at a temperature below 90° F. independent of an external cooling source.

19. The refrigeration system of claim 2 wherein the temperature threshold of said thermal process is between 70° F. and 250° F. and said vapor in said recycle line is at a temperature below 90° F. independent of an external cooling source.

20. The refrigeration system of claim 2 wherein said temperature controller selectively opens said solenoid valve in response to the temperature of said thermal processing crossing the preselected temperature threshold.

21. The refrigeration system of claim 2 wherein the preselected threshold is a temperature maximum and the temperature is greater than the threshold.

* * * * *